United States Patent [19]

Phillips et al.

[11] Patent Number: 5,643,355
[45] Date of Patent: Jul. 1, 1997

[54] OXYGEN GENERATING DEVICE

[75] Inventors: Robert John Phillips, Honiton; Adrian Simons, Yeovil, both of United Kingdom

[73] Assignee: Normaliar-Garrett (Holdings) Limited, Yeovil, England

[21] Appl. No.: 597,996

[22] Filed: Feb. 7, 1996

[30] Foreign Application Priority Data

Feb. 9, 1905 [GB] United Kingdom ............... 9502510
Aug. 16, 1995 [GB] United Kingdom ............... 9516755

[51] Int. Cl.$^6$ ............................................. B01D 53/22
[52] U.S. Cl. ........................ 96/4; 96/7; 55/210; 55/269; 128/205.27
[58] Field of Search ............... 55/210, 218, 267–269; 95/14, 15, 19, 22, 54; 96/4, 7, 9; 205/782.5, 783, 783.5, 784, 785, 793

[56] References Cited

U.S. PATENT DOCUMENTS

| | | | |
|---|---|---|---|
| 3,976,451 | 8/1976 | Blackmer et al. | 96/7 |
| 4,545,787 | 10/1985 | Hegarty | 95/54 X |
| 4,681,602 | 7/1987 | Glenn et al. | 95/54 X |
| 5,069,692 | 12/1991 | Grennan et al. | 96/4 |
| 5,108,465 | 4/1992 | Bauer et al. | 95/54 |
| 5,118,395 | 6/1992 | Chen et al. | 95/54 X |
| 5,160,713 | 11/1992 | Mazanec et al. | 95/54 X |
| 5,169,415 | 12/1992 | Roettger et al. | 95/54 |
| 5,174,866 | 12/1992 | Chen et al. | 95/54 X |
| 5,240,473 | 8/1993 | Carolan et al. | 95/54 |
| 5,240,480 | 8/1993 | Thorgood et al. | 95/54 X |
| 5,261,932 | 11/1993 | Carolan et al. | 95/54 |
| 5,447,555 | 9/1995 | Yee et al. | 95/54 |
| 5,496,388 | 3/1996 | Tellier | 96/4 X |
| 5,516,359 | 5/1996 | Kang et al. | 95/54 X |
| 5,547,494 | 8/1996 | Prasad et al. | 95/54 |
| 5,562,754 | 10/1996 | Kang et al. | 95/54 |
| 5,565,017 | 10/1996 | Kang et al. | 95/54 X |

FOREIGN PATENT DOCUMENTS 2257054  1/1993  United Kingdom ............... 95/54

Primary Examiner—Robert Spitzer
Attorney, Agent, or Firm—Larson & Taylor

[57] ABSTRACT

An oxygen generating device to which a gas mixture containing oxygen is fed, and which is operable to separate the gas mixture into oxygen rich and oxygen depleted gas components, the device comprising a first material which when at an elevated temperature at or above a minimum operating temperature, is active to separate the gas mixture into oxygen rich and oxygen depleted gas components wherein a second material is provided which produces a heating effect within the device when an electrical current passes therethrough, to heat the gas mixture at least when the gas mixture is at a temperature below the minimum operating temperature.

11 Claims, 4 Drawing Sheets

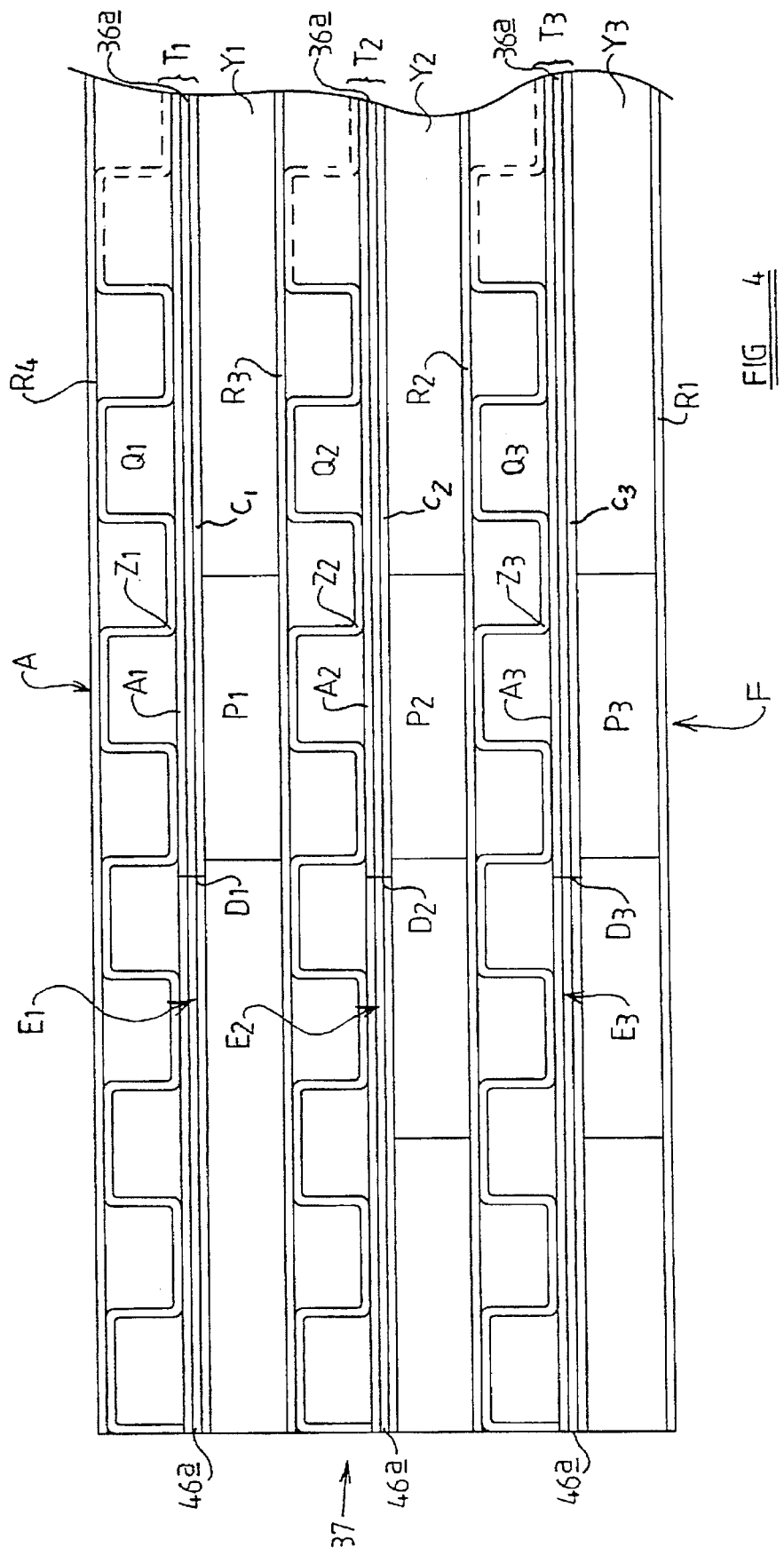

OXYGEN GENERATING DEVICE

DESCRIPTION OF BACKGROUND TO THE INVENTION

This invention relates to an oxygen generating device and to a system incorporating an oxygen generating device.

In order for passengers or aircrew in an aircraft to breath when exposed to ambient atmospheric pressure at elevated altitudes, it is necessary to provide a supply of breathing gas enriched with oxygen.

One means of achieving this is to carry within the airframe a supply of compressed oxygen gas, but particularly in a small aircraft, where space is at a premium, and/or in an aircraft where the added weight of the gas bottle containing the compressed oxygen gas is significant, this is not acceptable.

To reduce weight and space requirements another means is to carry within the airframe liquid oxygen. Liquid oxygen systems give rise to space and weight penalties and also a requirement for liquid oxygen to be available for replenishment of the liquid oxygen supply at a ground station.

DESCRIPTION OF THE PRIOR ART

More recently oxygen-enriched gas has been produced on-board of the aircraft by a so-called on-board oxygen generating system (OBOGS) based on pressure swing technology using a zeolite molecular sieve material to separate oxygen from air. This requires at least two zeolite beds which have to be sequentially cycled through on-stream/generating and off-stream/purge cycles. A limitation of such systems is that theoretically the maximum oxygen concentration obtainable in the product gas is 95% unless additional means are provided for the removal of argon and other trace gases from the supply air which is normally bleed air from a compressor stage of an engine powering the aircraft.

Increasing attention is now being given to ceramic membrane technology in provision of a system which will generate substantially 100% oxygen product gas or highly oxygen-enriched product gas of breathable quality for use in aerospace and other breathing applications. Such gas will hereinafter be referred to as being "oxygen rich", and the residual gas, will be referred to as being "oxygen depleted".

Certain ceramic materials (for example Yttria doped Zirconia or Gaddia doped Ceria), which are so-called ionic conductors of oxygen, become electrically conductive at elevated temperatures due to the mobility of oxygen ions within the crystal lattice. Since these materials are only conductive to oxygen ions in the presence of an electric current, an external electric circuit is needed. Temperatures in the order of at least 600° K. are required to obtain sufficient ionic conductivity.

Such ceramic oxygen generating devices may comprise one or more ceramic membranes through which an electrical current is passed, whilst ambient air is supplied to one face of the membrane which allows oxygen in the supply air to diffuse through the membrane by ionic transport when the membrane is at the required elevated temperature, and be recovered on the other side of the membrane.

To ensure that the ambient air entering the device does not cool the membrane and prevent it from efficiently being heated to a minimum operating temperature, the ambient supply air is pre-heated typically by passing the supply air through a heat exchanger to which hot oxygen rich gas and/or hot oxygen depleted gas delivered from the oxygen generating device is fed, so that the cooler ambient air is heated.

The electrical current passing through the material has a heating effect on the material and on the air passing through the device, and at least after an initial warm up period, the oxygen generating device is self sustaining at a temperature above the minimum operating temperature at which air is separated into its oxygen rich and oxygen depleted air components.

The ambient air fed to the oxygen generating device, and electrical current passed through the material can be controlled as necessary, to ensure that the demand for the oxygen rich air supply is met, and so that overheating of the oxygen generating device does not occur.

However, whereas such oxygen generating devices operate generally satisfactorily after an initial warm up period, there is a requirement to reduce the warm up period to a minimum time. In any event, with at least some commonly used ceramic membrane materials, there is a high electrical resistance through the material at lower temperatures, and so the magnitude of electrical current which can pass through the material to cause a heating effect, is small during the initial warm up period when the oxygen generating device is at a low temperature. Hence little or no heat is dissipated to the air passing through the oxygen generating device.

Hence for rapid warm up it is necessary to provide a preheater to heat the ambient air prior to the ambient air passing through the oxygen generating device. Such a preheater may comprise a conventional electrical resistance heater, but due to the magnitude of current required, bulky and heavy switch and control gear is required, which has a space requirement and significant weight implications.

SUMMARY OF THE INVENTION

According to a first aspect of the invention we provide an oxygen generating device to which a gas mixture containing oxygen is fed, and which is operable to separate the gas mixture into oxygen rich and oxygen depleted gas components, the device comprising a first material which is active at an elevated temperature above a minimum operating temperature, to separate the gas mixture into oxygen rich and oxygen depleted gas components, there being a second material provided which produces a heating effect within the device when an electrical current passes therethrough to heat the gas mixture at least when the gas mixture is at a temperature below the minimum operating temperature.

Thus there is no need to provide any separate preheating means to provide for rapid warm up of the oxygen generating device. The second material may comprise a positive temperature coefficient of resistance material, the heating effect of which may decrease as the temperature within the device increases towards the minimum operating temperature. The first material may comprise a negative temperature coefficient of resistance material and electrical current may be passed through the first material so that this provides a heating effect within the device at least when the device is at a temperature at or above the minimum operating temperature.

Hence on start-up, the second material will conduct the electric current thus to provide a heating effect to the gas mixture passing through the oxygen generating device. As the device warms up, the heating effect of the second material may decrease, but the heating effect of the first material will increase, and the first material can then become active to cause separation of the oxygen rich and oxygen depleted gas components of the gas mixture passing into the device.

The gas mixture may pass into contact with one of the first and second materials, and then subsequently into contact with the other of the first and second materials, the first and the second materials being arranged separately from one another within the device. Alternatively, the first and second materials may be contained within a matrix such that the gas mixture may pass simultaneously into contact with both the first and second materials.

One embodiment of the oxygen generating device may comprise a housing having a passage therethrough for gas in which passage the first and second materials are arranged. The gas may pass through layers of the first and second materials there being duct means into which the oxygen rich gas component can flow and hence be collected for use.

In another embodiment, the device may comprise one or more passages for gas through the device, defined by passage walls which support the first and second materials, such that the gas contacts the first and second materials as it flows through the passage or passages. In this case, the walls of the passages preferably permit oxygen rich gas component to pass out of the passage or passages, through the walls to a duct means from which the oxygen rich gas component can be collected for use.

According to a second aspect of the invention, we provide an oxygen generating system including an oxygen generating device according to the first aspect of the invention, the system including a heat exchanger through which the gas mixture passes prior to being fed to the oxygen generating device, there being passage means for heated oxygen depleted gas component and/or oxygen rich gas component from the oxygen generating device to be fed to the heat exchanger such that the gas mixture is preheated by heat exchanged from the oxygen depleted gas component and/or the oxygen rich gas component.

The system may include a control means to control the gas mixture fed to the oxygen generating device and to control the temperature within the device thereby to achieve a desired rate of production of oxygen rich gas component.

According to a third aspect of the invention we provide an oxygen generating device to which a gas mixture containing oxygen is fed, and which is operable to separate the gas mixture into oxygen rich and oxygen depleted gas components, the device comprising a negative temperature coefficient of resistance material which is active at an elevated temperature above a minimum operating temperature, to separate the gas mixture into oxygen rich and oxygen depleted gas components, there being means to pass an electrical current through the device to produce a heating effect within the device to heat the gas mixture at least towards the minimum operating temperature, wherein the device comprises a plurality of active sections through each of which the gas mixture passes in turn and the electrical current supply is connected to each of the sections so that the sections electrically are in series.

Thus the electric current passing through any of the active sections, is limited by the active section with the highest electric resistance, which in general will be the coolest section.

Particularly where heated oxygen enriched and/or oxygen depleted gas from the device is used to preheat the gas mixture fed to the device, the device can be thermally managed, at least when the temperature of the device is above the minimum operating temperature, by a less complex thermal control system than would otherwise be required, to ensure that overheating of the device does not occur.

BRIEF DESCRIPTION OF THE DRAWINGS

The invention will now be described with reference to the accompanying drawings in which:

FIG. 4 is a diagrammatic illustrative view in cross-section to an enlarged scale of part of the oxygen generating device of FIG. 2;

DESCRIPTION OF THE PREFERRED EMBODIMENTS

Figure 1:
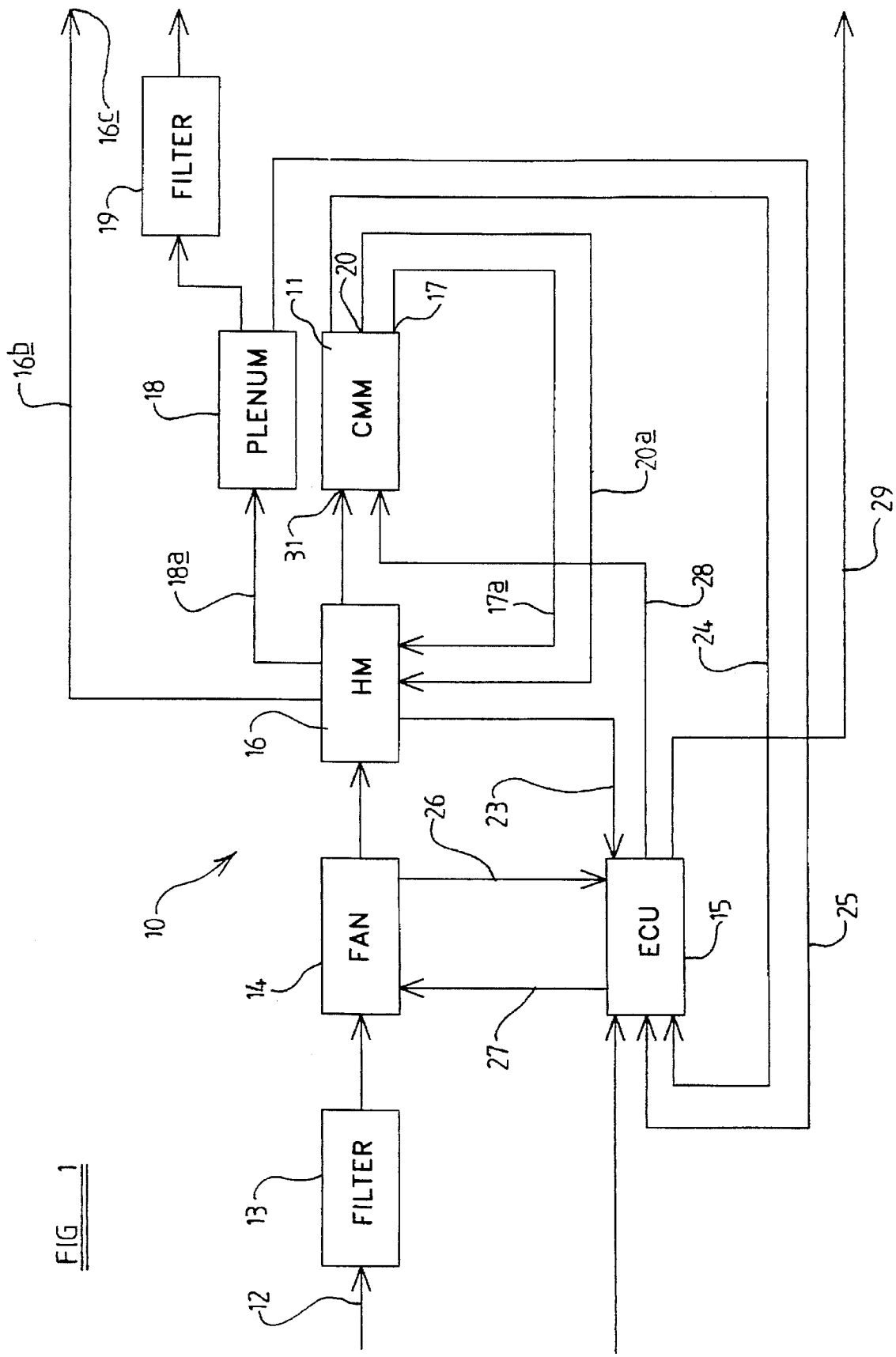
FIG. 1 is a diagrammatic illustration of an oxygen generating system incorporating an oxygen generating device in accordance with the invention.

Referring to FIG. 1, there is shown an oxygen generating system 10, which has at its heart, a ceramic membrane module 11 being an oxygen generating device in accordance with the invention.

A gas mixture such as for example ambient air from an uncompressed compartment of an aircraft, enters the system through an inlet 12, where any debris entrained in the inlet 12 is filtered from the ambient air by a filter 13. The air is drawn into the inlet 12 and is fed through the remainder of the system via a fan 14 the speed of which is controlled by an electrical control unit 15 as hereinafter described.

The ambient air which may be at a very cool temperature indeed, possibly below 273° K. then passes through a heater module 16 which will be described in more detail hereinafter, where, at least after the system 10 has warmed up, the ambient air will be pre-heated before the air passes into the ceramic membrane module 11.

The ceramic membrane module 11 generates oxygen rich air component as hereinafter described, which passes from the module 11 via an outlet 17. The oxygen rich air component passes through the heater module 16 via line 17a where at least some of its heat is dissipated to the ambient air, so that a cooled oxygen rich air supply is obtained, which is fed via line 18a to a plenum 18, where the oxygen rich gas component may pass to, for example, an aircrew via a filter 19 where the oxygen rich air component can be breathed, particularly at ambient atmospheric pressure at elevated altitudes.

The volume of the plenum 18 may be adjusted as required, but generally is of a small volume being the equivalent to perhaps, the volume of line 18a from the heater module 16 to the filter 19.

The ceramic membrane module 11 also produces a supply of hot oxygen depleted air component which passes from the module via an outlet 20. The hot oxygen depleted air component is also fed to the heater module 16, along a line 20a. where at least some of its heat is dissipated to the ambient air passing through the heater module 16. The cooled oxygen depleted air component then passes from the heater module 16 via line 16b and is disposed of, for example through an external port 16c of the aircraft.

Conventionally, the heater module 16 would also comprise an electrical resistance or some other kind of auxiliary heater so that during an initial warm up period, the ambient air entering the heater module 16 can be warmed so that warmed air is fed to the ceramic membrane module 11 rather than cold air and this is still an option in combination with the present invention.

It will be appreciated from the discussion below that the ceramic membrane module 11 can only operate to separate the ambient air into its oxygen rich and oxygen depleted air components, when at a temperature above a minimum operating temperature, typical operating temperatures are in the range 800°–1200° K. In accordance with the invention, however, such auxiliary heating in the heater module 16 is not required. However, it will be appreciated from FIG. 1 that the temperature of the ambient air within the heater module 16, and/or the temperature of the oxygen rich and/or oxygen depleted air component within the heater module 16, is monitored, so as to provide a suitable input via line 23 to the electronic control unit 15. Also, the temperature within the ceramic membrane module 11 is also monitored, so as to provide an input 24 to the electronic control unit 15 to protect the ceramic membrane module 11 from overheating.

The pressure of the oxygen rich air component supply in plenum 18 is also monitored, e.g. by a pressure transducer which provides an input 25 to the electronic control unit 15. The speed of the fan 14, and hence the volume of air being delivered to the heater module 16 and subsequently the ceramic membrane module 11, is monitored and an input 26 is provided to the electronic control unit 15.

In response to demand for oxygen rich gas component the electronic control unit 15 controls the speed of the fan 14 via a line 27, and the power fed to the ceramic membrane module 11 via a line 28 to control the level of oxygen generation in the ceramic membrane module 11. There is also a built in test which results in an output indicated at 29 for example, to alert an aircrew to the fact that the system 10 is not operating correctly.

Operation of the ceramic membrane module 11 will now be described in more detail with reference to FIGS. 2 to 6.

Figure 2:
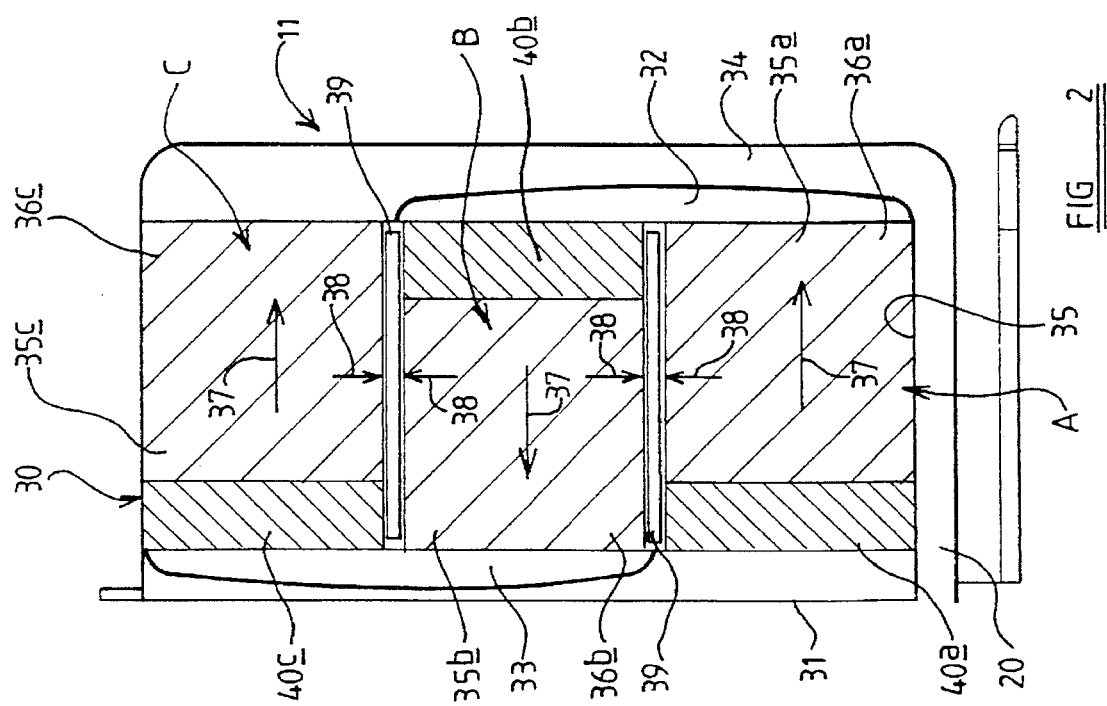
FIG. 2 is an illustrative sectional view of one embodiment of an oxygen generating device in accordance with the invention.

Referring first to FIG. 2, the ceramic membrane module 11 comprises a housing 30 which has a passage 35 for gas therethrough. The passage has an inlet 31, a first flow reverse box 32, a second flow reverse box 33, and an outlet 20 to which oxygen depleted air component is fed from the device 11 via ducting 34.

The ceramic membrane module 11 comprises a first, ceramic, material through which electrical current is passed, the material being active when at an elevated temperature above a minimum operating temperature to cause separation of air or other gas into oxygen rich and oxygen depleted gas components. Generally, the oxygen rich gas component will flow orthogonally to the oxygen depleted gas component, and both such components will flow in directions generally orthogonal to the direction in which the electrical current is flowing.

In FIG. 2, in a first passage part 35a between the inlet 31 and the first flow reverse box 32, there is a first active section A comprising first material 36a in the form of a ceramic membrane stack. One suitable material consists of an electrolyte membrane such as Cerium Gadolinium Oxide (CGO) coated on both sides with an electrode made for example of Lanthanum Strontium Cobalt Ferrite (LSCF). The direction of flow of the oxygen depleted air component is indicated at 37 (which is the same direction as the gas mixture), whilst the direction of flow of oxygen rich air component is indicated at 38. It can be seen that direction 38 is generally orthogonal to the extent of the first passage part 35a between the inlet 31 and the first flow reverse box 32, such that the oxygen rich air component flows into a duct 39 from which it may be collected and flow from the device 11 to the outlet 17 shown in FIG. 1.

The oxygen depleted air component flow direction is reversed in box 32, and passes into a second active section B which comprises a passage part 35b between the flow reverse boxes 32 and 33. The second passage part 35b contains a membrane stack 36b of first material, through which the gas flows. Again, the direction of flow of the oxygen depleted component is indicated at 37, and the directions of flow of the oxygen rich air component into duct 39 are indicated at 38.

Within a third passage part 35c between the second flow reverse box 33 and the ducting 34 for the oxygen depleted air component, there is a third active section C comprising yet another membrane stack 36c of first material. Again the relative directions of flow of the oxygen depleted air component and oxygen rich air component through membrane stack 36c are indicated by arrows 37 and 38 respectively.

Figure 6:
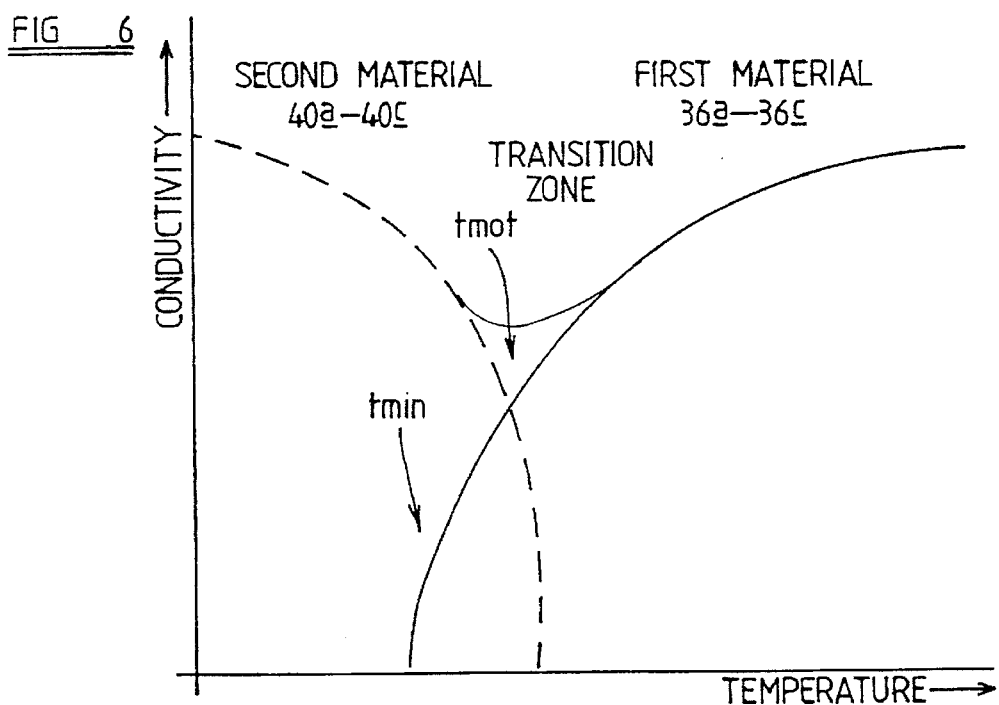
FIG. 6 is a graph showing the relative conductivities of first and second materials which may be used within an oxygen generating device in accordance with the invention, as conductivity varies with temperature.

Referring now to FIG. 6, there is shown in full lines a graph showing how the conductivity of the first material 36a–36c changes with temperature. Below a cut-off temperature $t_{min}$ it can be seen that the first material 36a–36c provides substantially no conductivity. The first material 36a–36c will fail to separate the ambient air into its oxygen rich and oxygen depleted air components until the material 36a–36c is at a minimum operating temperature $t_{mor}$.

Hence during an initial warm up period, little or no heat may be dissipated to the ceramic membrane module 11 by the first material 36a–36c as little or no electrical current will be permitted to flow therethrough because the first material 36a–36c will be substantially non-conducting.

In accordance with the invention, prior to the air passing through the first material 36a in the first passage part 35a, the air passes through a membrane stack 40a of a second ceramic material. The second material 40a may again be a ceramic material, but exhibiting a positive temperature coefficient of resistance. Suitable second material may be based on the barium titanate perovskite system.

Hence at temperatures below $t_{min}$ indicated in FIG. 6, the second material 40a will conduct electricity therethrough and thus a heating effect will be achieved in the ceramic membrane module 11. In FIG. 6, the conductivity of the second material 40a relative to temperature is indicated by the dotted lines. As the temperature within the module 11 increases, the amount of electrical current conducted by the second material 40a decreases and hence the heating effect due to the material 40a will decrease. It can be seen that it is envisaged that the conductivities of the first and second materials 36a–36c and 40a will be about equal around the temperature $t_{mor}$ being the minimum operating temperature, which the first material 36a–36c must attain in order to perform its function of separating the ambient air into oxygen rich and oxygen depleted air components. This may be around 600° K.

Referring again to FIG. 2, in the second passage part 35b between the first flow reverse box 32 and the second flow reverse box 33, there is a further membrane stack of second material 40b, and in the third passage part 35c between the second flow reverse box 33 and the duct 34, there is a yet further membrane stack of second material 40c. In this embodiment, the air as it flows through the ceramic membrane module 11 sequentially comes into contact with second material 40a, then first material 36a and so on. In another embodiment, instead of the first and second materials 36a–36c and 40a–40c being arranged in membrane stacks separate from one another as indicated in FIG. 2, the materials may be contained within a common matrix such that air passing through the ceramic membrane module 11 may simultaneously come into contact within the first and second material contained in the matrix.

The amount of oxygen rich air component generated, can be adjusted by regulating the electrical current which passes through the ceramic membrane module 11, e.g. by changing the voltage across the module 11, and by adjusting the rate of delivery of ambient air to the inlet 31, by adjusting the speed of fan 14.

In the event that the temperature within the ceramic membrane module 11 increases to such an extent that the oxygen rich gas component is at too-elevated a temperature e.g. for comfortable breathing, which will be apparent by monitoring the temperature within the ceramic membrane module 11, the amount of ambient air fed to the ceramic membrane module 11 may be increased by increasing the speed of fan 14, and/or, the amount of electrical current passing through the device 11 may be decreased by reducing the voltage across the device.

Thus the speed of the fan 14 may be determined with reference to the input 25 from the plenum 18, and/or in dependence upon a feedback signal derived from the temperature of the ceramic membrane module 11 and/or the temperature of oxygen rich gas components generated therein or the oxygen depleted air.

Figure 3:
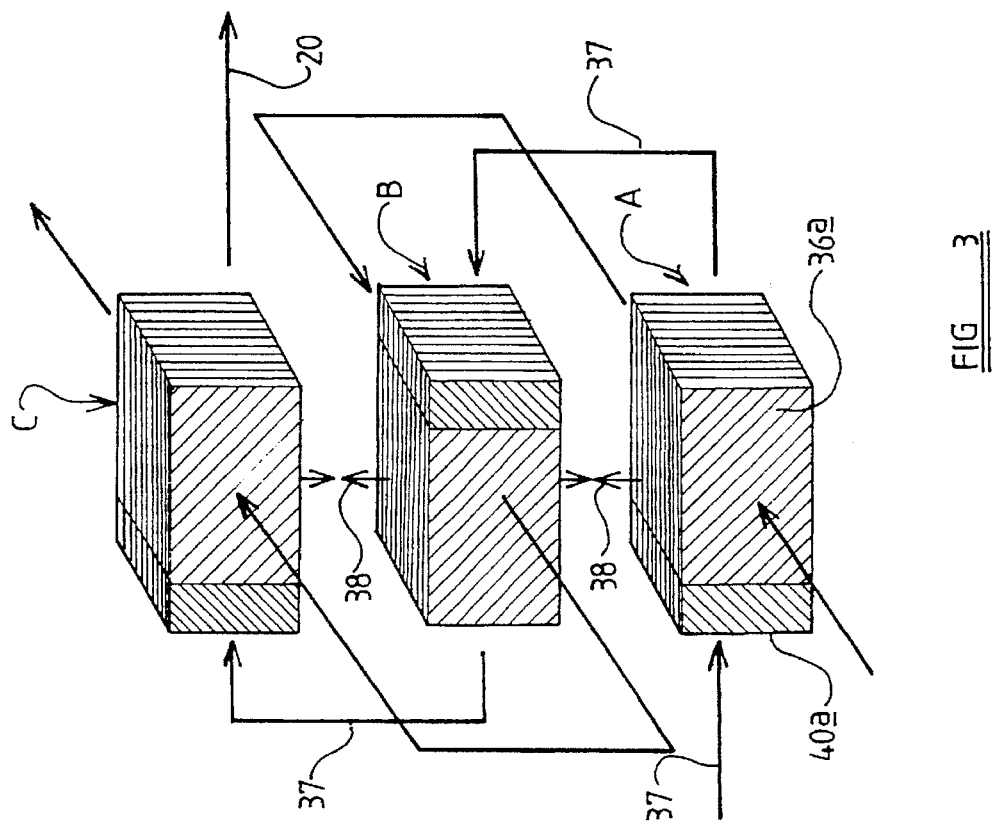
FIG. 3 is a diagrammatic exploded view of the embodiment of FIG. 2 showing the respective, air, current and oxygen paths through and in the device.

Referring now to FIG. 3 the device of FIG. 2 is shown diagrammatically with the paths of air flow and oxygen rich gas flow being indicated at 37 and 38 respectively. Other parts are labelled with the same reference numerals as in FIG. 2.

It can be seen from FIG. 3 that the electrical current is arranged to pass through the three ceramic stack active sections A, B and C in series so that there is a voltage drop across each active section A, B, C.

It has been found that utilising a single sheet membrane of first material which is active to separate the gas mixture into oxygen rich and oxygen depleted components is unacceptable in design terms and impracticable due to the required size of that sheet. Also the electrical current flow required through such a membrane to achieve adequate volumes of separation of oxygen rich and oxygen depleted gas components, is unacceptably high.

Hence the preferred design of the device is to provide a plurality of separate stacks of active first (and second) material. Thus a practically sized device 11 can be provided and acceptably low electrical current is required.

Nevertheless there remains a problem of thermal gradients within the device, which can result in thermal stresses which could seriously damage the integrity of the device.

In accordance with the third aspect of the invention however the electrical current is caused to flow in series through the active sections A, B and C of the device. In this way it will be appreciated that the electrical resistance of the second active section B, the first material 36b of which is a negative temperature coefficient of resistance material, is dependent upon the temperature of the gas mixture (air) delivered to it from the first active section A of the device 11.

Hence the inventors realised that the device 11 can thermally be managed with a control system less complex than would otherwise be required. As the temperature of air entering active section B of the device 11 increases, the resistance of the first negative temperature coefficient of resistance material 36b in active section B will decrease resulting a reduced heating effect in active section B with the result that the temperature rise of the oxygen depleted air fed through active section B of the device to active section C, will be restricted. Any increase in temperature of the air fed to active section C, could for example by a decrease in the temperature of the air fed to active section B, will cause the heating effect of the negative temperature coefficient of resistance first material 36c of the third active section C of the device to decrease, and so the heating effect of active section C and any further active sections of the device 11 will be restricted.

Hence by connecting the active sections A, B and C of the device, or at least two active sections of the device in series, the device 11 can thermally be managed at least when operating at a temperature above the minimum operating temperature of the first material 36a to 36c.

Although in the example described the first active section A is the coolest and has the higher resistance, in another arrangement, another of the active sections B, C could be arranged to have the highest electrical resistance and thus be primarily responsible for limiting the electric current through all the active sections A, B and C.

In FIG. 4 a portion of one of the active section A of the device 11 is shown illustratively to an enlarged scale.

Passages P1–P3 for the air and oxygen depleted gas are formed by castellations of a corrugated or castellated interconnect sheets Y1 to Y3 and perforated sheets C1 to C3 being respective cathodes of the device 11 for each of the individual active layers of the stack section. Each cathode C1 to C3 forms one layer of a tri layer T1,T2,T3 which comprises the planar cathode C1 to C3, an intermediate planar electrode layer E1 to E3, which is of a first, negative temperature co-efficient of resistance material 36a and a planar anode A1 to A3.

A voltage is applied across the device between the interconnect sheet R1 and a boundary sheet R4. R2 and R3 also act as interconnect sheets.

Oxygen molecules contained in the gas stream within the passages P1 to P3 diffuse through the porous cathode layers C1 to C3 to the electrolyte layers E1 to E3. The applied voltage causes the oxygen molecules to ionise at the electrode layers E1 to E3. The resultant anions pass through the electrolyte layers E1 to E3 and reform at the anode layers A1 to A3, and hence pass into the passages Q1 to Q3 which extend transversely to the passages P1–P3 and are also formed by corrugations/castellations formed in a corrugated or castellated sheet Z1–Z3. Electrical current thus passes through the active section A of the device in the direction shown by arrow F through the various layers of the active section A of the device 11.

The construction shown in FIG. 4 shows a device with three layers, although more than three layers may be provided.

For an air pre-heating section, the arrangement may be similar to that of FIG. 4, but the electrolyte layers E1 to E3 would be replaced by suitable positive temperature co-efficient of resistance material (40a). The electrical potential applied across the outermost interconnect and boundary sheets R1 and R4 allows electrical current to flow through the various layers of the section of the device, when the temperature is below that required for minimum operation.

Whilst such a preheating section could be separate from the active oxygen generating section A, advantageously the sections are combined, with the sections being separated from one another by separators, such as indicated at D1 to D3 in FIG. 4.

Thus, a flow of electrical current can occur through the preheating section (or sections) and through the oxygen generating section (or sections) depending on the temperature, as indicated by the graph of FIG. 6.

By virtue of the preheating section or sections the onset of oxygen production occurs on start up, before it otherwise would. The transition between electrical current passing through the preheating section or sections and the oxygen generating section or section would ideally be instantaneous, but practically there is a transition zone where there is parallel electrical conductivity, as indicated in the graph of FIG. 6, which occurs with both the preheating and oxygen generating sections being conductive.

Various alternative constructions to that shown in FIGS. 2 to 4 are possible in which air passes separately through active sections, to which electrical current is applied, to pass in series through the sections. For example, the same principles can be applied to a tubular ceramic oxygen generating arrangement.

Figure 5:
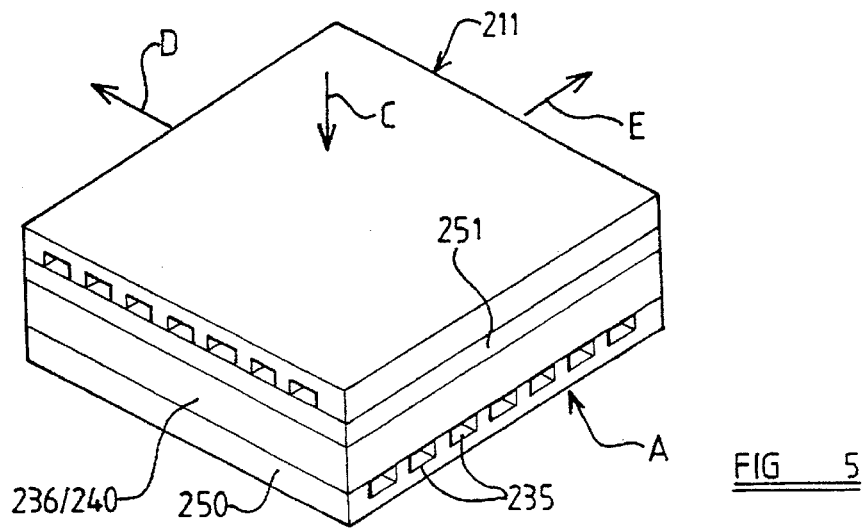
FIG. 5 is a diagrammatic illustrative view on an alternate embodiment.

In FIG. 5 a flat plate design of one active section A of a ceramic membrane module 211 is shown, there being a first electrode 250 and a second electrode 251, with a matrix containing first and second material 236 and 240 between them. Ambient air passes into passageways provided between the lower plate electrode 250 and the matrix 236/240 of ceramic materials, whilst electrical current flows in the direction shown by arrow G, between one electrode 251 and the other electrode 250.

Oxygen depleted air component flows from the passageways 235 in the direction indicated by arrow D, whilst oxygen rich gas component flows from passageways in the direction shown in arrow E from the device, for use.

A plurality of such plate constructions may be arranged stacked one on top of another to provide each active section.

Figure 7:
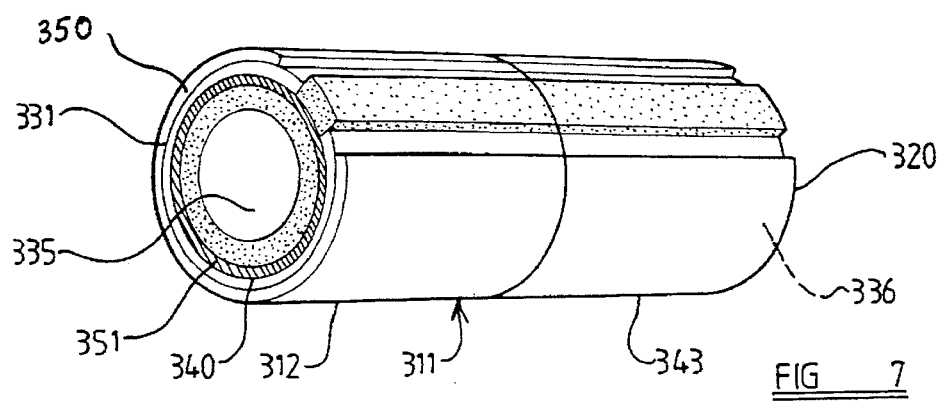
FIG. 7 is a diagrammatic illustrative perspective view of another embodiment of the invention.

Various other alternative constructions are possible without departing from the scope of the invention. For example, referring to FIG. 7, there is shown a device 311 which is essentially cylindrical in construction, having a central passageway 335 from one end, being an inlet end 331, to an outlet end 320. The device 311 is made of a suitable ceramic material, which is porous in nature. Porous passage walls support in the passageway 335, within a first part 312, second material 340 which has a negative temperature coefficient, like the material 40a–40c of the module 11 described with reference to FIG. 2.

The porous walls support within the passageway 335 along a second part 343 of the device 311, first material 336 of the kind indicated at 36a–36c in the module 11 of FIG. 2, electrical current being passed through walls of the device between an external electrode indicated at 350, and an internal electrode 351, with the active first or second material positioned between the electrodes.

During an initial warm up period, the second material in the first part 312 of the device will dissipate heat to ambient air entering the passage 335 via the inlet 331 thus to heat the air. As the temperature of the device 311 increases, the second material within the second part 313 of the device will become activated to separate the ambient air into oxygen depleted air component which flows from outlet 320 of the device 311, and oxygen rich air component which will flow through the porous walls of the device 311 into a duct means (not shown) from where it may be collected for use.

Hence various modifications are possible without departing from the scope of the invention, the essential components of the first and second aspects of the invention being the presence of a second material which can produce a heating effect within the oxygen generating device when electrical current passes through the material to heat the gas mixture, at least when the gas mixture within the device is at a temperature below the minimum operating temperature of the first material, and possibly at temperatures also below the temperature at which the first material can conduct electricity and thus dissipate heat within the oxygen generating device. Thus the first material may not be of the kind through which electrical current is passed to produce a heating effect, but the gas passing into the device may be heated by other means to above the minimum operating temperature.

The actual arrangement of control of an oxygen generating system incorporating such a device may be modified compared to the arrangement shown in FIG. 1 which is given for example only. The relationship of conductivity to temperature for actual materials selected for use may not be exactly as indicated in FIG. 6.

We claim:

1. An oxygen generating device which is operable to separate gas mixture fed thereto into oxygen rich and oxygen depleted gas components, the device comprising an inlet means to which a gas mixture containing oxygen is fed, first material which is active at an elevated temperature above a minimum operating temperature, to separate the gas mixture into oxygen rich and oxygen depleted gas components, and second material which produces a heating effect within the device when an electrical current passes therethrough to heat the gas mixture at least when the gas mixture is at a temperature below the minimum operating temperature.

2. A device according to claim 1 wherein the second material comprises a positive temperature coefficient of resistance material, the heating effect of which thus decreases as the temperature within the device increases towards the minimum operating temperature.

3. The device according to claim 1 wherein the first material comprises a negative temperature coefficient of resistance material which provides a heating effect within the device when electrical current passes therethrough at least when the temperature is at or above the minimum operating temperature.

4. A device according to claim 1 wherein the gas mixture passes into contact with one of the first and second materials and subsequently into contact with the other of the first and second materials, the first and second materials being separate from one another within the device.

5. A device according to claim 1 wherein the first and second materials are contained within a matrix such that the gas mixture may pass simultaneously into contact with the first and second materials.

6. A device according to claim 1 which comprises a housing having a passage therethrough for the gas in which passage the first and second materials are arranged, the first and second materials being arranged in layers such that the gas passes through the first and second materials and there being duct means into which the oxygen rich gas component can flow and hence be collected for use.

7. A device according to claim 1 which comprises at least one passage for gas through the device defined by passage walls which support the first and second materials such that the gas contacts the first and second materials as it flows through the passage or passages.

8. A device according to claim 7 wherein the walls of the passage permit oxygen rich gas component to pass out of the passage to a duct means from which the oxygen rich gas component can be collected for use.

9. An oxygen generating system including an oxygen generating device which is operable to separate gas mixture fed thereto into oxygen rich and oxygen depleted gas components, the device comprising an inlet means to which a gas mixture containing oxygen is fed, first material which is active at an elevated temperature above a minimum operating temperature, to separate the gas mixture into oxygen rich and oxygen depleted gas components, and second material which produces a heating effect within the device when an electrical current passes therethrough to heat the gas mixture at least when the gas mixture is at a temperature below the minimum operating temperature, the system including a heat exchanger through which the gas mixture passes prior to being fed to the oxygen generating device, there being passage means for at least one of heated oxygen depleted gas component and oxygen rich gas component from the oxygen generating device to be fed to the heat exchanger such that the gas mixture is preheated by heat exchanged from the at least one of the oxygen depleted gas component and the oxygen rich gas component prior to being fed to the oxygen generating device.

10. A system according to claim 9 which includes a control means to control the gas mixture fed to the oxygen generating device and to control the temperature within the device thereby to achieve a desired rate of producing of oxygen rich gas component, with a required proportion of oxygen contained therein.

11. A oxygen generating device to which a gas mixture containing oxygen is fed, and which is operable to separate the gas mixture into oxygen rich and depleted gas components, the device comprising a negative temperature coefficient of resistance material which is active at an elevated temperature above a minimum operating temperature, to separate the gas mixture into oxygen rich and oxygen depleted gas components, there being means to pass an electrical current through the device to produce a heating effect within the device to heat the gas mixture at least towards the minimum operating temperature, wherein the device comprises a plurality of active sections through each of which gas mixture passes in turn and the electrical current supply is connected to each of the sections so that the sections electrically are in series.

* * * * *